UNITED STATES PATENT OFFICE.

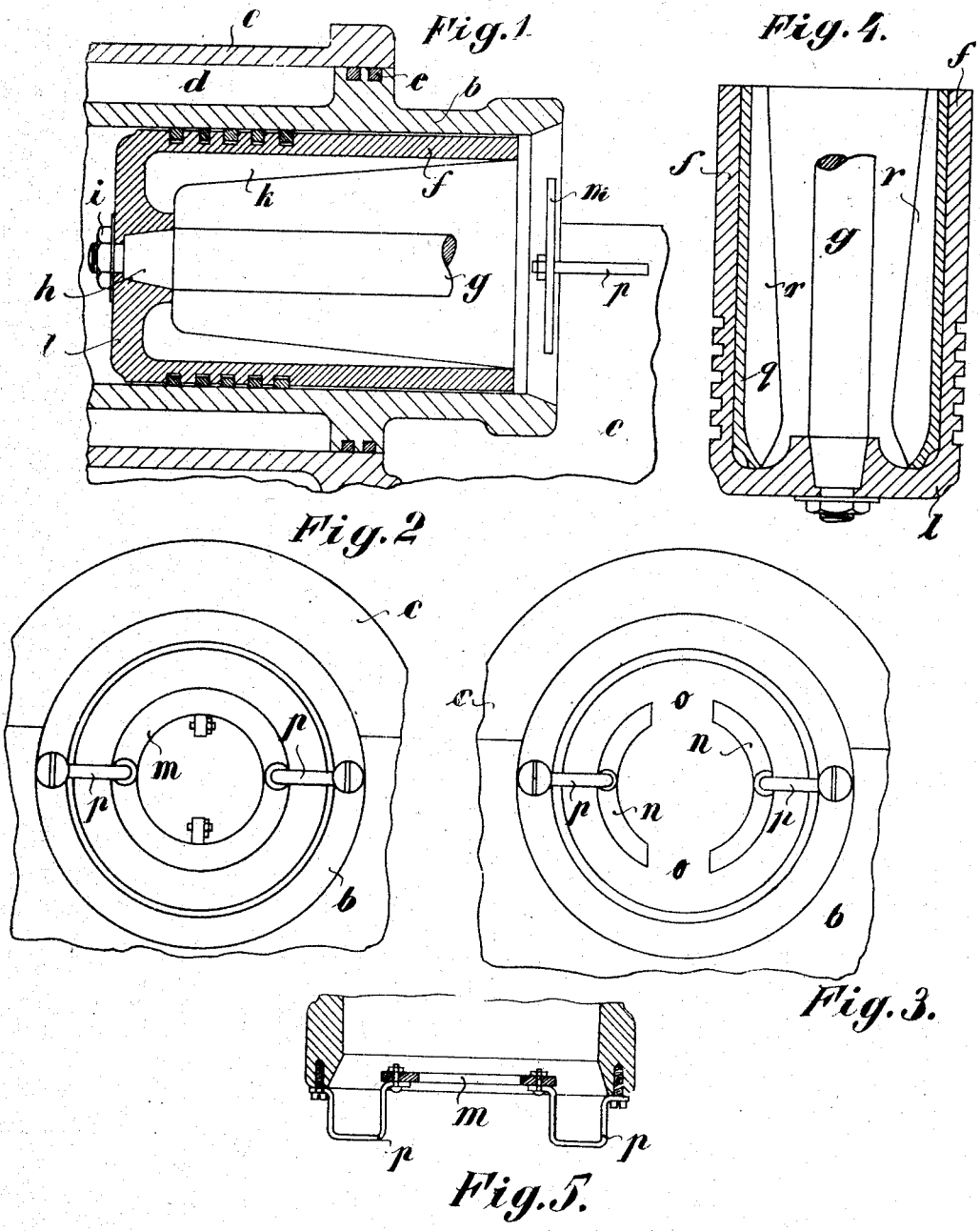

JULIUS HARTOCH, OF WIESBADEN, GERMANY.

PISTON FOR INTERNAL COMBUSTION OR EXPLOSION ENGINES.

No. 874,006.　　　　Specification of Letters Patent.　　　Patented Dec. 17, 1907.

Application filed May 11, 1907. Serial No. 373,079.

*To all whom it may concern:*

Be it known that I, JULIUS HARTOCH, a subject of the Emperor of Russia, residing at Wiesbaden, in the Kingdom of Prussia, German Empire, have invented certain new and useful Improvements in Pistons for Internal Combustion or Explosion Motors, for which the following is a full, clear, and exact description.

The present invention has for its object a device for cooling the piston bottom of internal combustion or explosion motors.

As is known, the pistons of large gas engines are generally water cooled, but in the case of small motors with cylinders of small diameter cooling of the piston is not usually resorted to, as water cooling leads to many difficulties in such small engines. Now in order to render it possible to make use of the advantages of the piston cooling in the case of small motors, which are usually constructed with open cylinders in such a manner, that the trunk piston carries the cross head gudgeon in accordance with the present invention, thin cooling ribs are provided in the cavity of the piston. On the cylinder mouth a forcing plate is arranged, which enters into the piston cavity during the forward stroke of the piston, so that the movement of the piston and its rod is not impeded. Owing to this arrangement, the warm air within the piston cavity is forced out when the piston makes its forward stroke and fresh air is sucked in when the piston makes its inward stroke. The cooling inner surface of the piston is enlarged by the arrangement of the inner ribs, and so the entering fresh air may cool very efficiently the piston bottom.

Reference is to be had to the accompanying drawings, in which:

Figure 1 is a longitudinal section of the former end of the cylinder of an explosion motor with the piston in its bore, Figs. 2 and 3 are plan views of the cylinder mouth and Fig. 4 shows a modified form of the piston. Fig. 5 shows the U-shaped stay-rods, by which the forcing plate is fastened to the motor frame.

In Fig. 1 *b* is the cylinder of an explosion motor. The cylinder is rigidly connected with the frame *c* of the motor, so that an annular space *d* remains between the outer surface of the cylinder and the inner surface of the frame. Packing rings *e* of suitable metal are provided for tightening the cylinder within the frame. The hollow piston *f* bears the piston rod *g*, which is connected to the piston by means of a cone *h* and screw and nut *i*. In its interior the piston is provided with thin cooling ribs *k*, which extend from the piston *l* to the forward end of the piston.

On the cylinder mouth a forcing plate *m* is arranged, which is formed as an annular plate, so that the movement of the piston and of its rod is not impeded. If the piston rod is rigidly connected to the piston, as shown in Fig. 1, the forcing plate *m* has the form of an annular plate as shown in Fig. 2. If the piston rod is pivoted to a cross head gudgeon, arranged in the hollow of the piston, there are two forcing plates *n*, *n*, between which a space *o* remains, in which the connecting rod can enter. The forcing plate is fastened to the frame of the machine by U-shaped stay rods *p* as shown in Fig. 5 so that the piston can move outward from the cylinder.

The cooling ribs may be formed as a separate part as shown in Fig. 4. In the piston *f* a hollow cylinder *q* of thin metal is inserted and the cylinder *q* is provided with the cooling ribs *r*. This is a very advantageous arrangement, as it permits of using any suitable metal, so that very thin ribs may be obtained by casting.

What I claim as my invention and desire to secure by Letters Patent is:

1. In internal combustion or explosion motors the combination of a hollow plunger piston being open at one end and having internal cooling ribs with a means for forcing out the air in the piston cavity.

2. In internal combustion or explosion motors the combination of a hollow piston being open at one end and having in its interior a system of cooling ribs forming a separate part of any suitable metal with a means for forcing out the air in the piston cavity.

3. In internal combustion or explosion motors the combination of a hollow piston being open at one end and having in its interior cooling ribs with a forcing plate arranged at the open end of the cylinder and of such a form that the movement of the piston and its rod is not impeded.

JULIUS HARTOCH.

Witnesses:
MORITZ WETZEL,
HEINRICH GREIS.